United States Patent
Verhaeghe

(10) Patent No.: US 6,634,673 B1
(45) Date of Patent: Oct. 21, 2003

(54) CROSS TIE FOR A VEHICLE CHASSIS AND METHOD FOR MAKING THE SAME

(75) Inventor: Jan Verhaeghe, Haasdonk (BE)

(73) Assignee: Groep Stevens International, Naamloze Vennootschap (BE)

(*) Notice: Subject to any disclaimer, the term of this patent is extended or adjusted under 35 U.S.C. 154(b) by 0 days.

(21) Appl. No.: 09/868,655

(22) PCT Filed: Dec. 14, 1999

(86) PCT No.: PCT/BE99/00163
§ 371 (c)(1),
(2), (4) Date: Jul. 3, 2001

(87) PCT Pub. No.: WO00/40450
PCT Pub. Date: Jul. 13, 2000

(30) Foreign Application Priority Data

Jan. 5, 1999 (BE) .............................................. 9900003

(51) Int. Cl.[7] .............................................. B62D 21/00
(52) U.S. Cl. .................................. 280/781; 156/244.45
(58) Field of Search ................................ 280/781, 785, 280/789, 800, 796, 797; 180/311; 296/205; 29/897, 892.2, 897.3, 897.312, 419.1, 452; 156/169, 173, 175, 189, 244.45

(56) References Cited

U.S. PATENT DOCUMENTS 1,893,721 A * 1/1933 Wahlberg .................... 280/796
2,107,382 A * 2/1938 Maddock .................... 280/796
6,308,412 B1 * 10/2001 Christofaro et al. ....... 29/897.2

* cited by examiner

*Primary Examiner*—Eric Culbreth
*Assistant Examiner*—Faye M. Fleming
(74) *Attorney, Agent, or Firm*—Bacon & Thomas, PLLC

(57) ABSTRACT

Method for making a cross tie (9) for a vehicle chassis (3) and a vehicle chassis provided with such a cross tie, according to which method the cross tie (9) is at least partially made of composite material, characterised in that the cross tie (9) is made with an almost cylindrical center part (10) and a part (11) connected to both ends thereof which widens towards the end of the cross tie (9), whereby the above-mentioned parts (10 and 11) are made in one piece by means of filament winding, and the filaments are provided in the central part (10) at an angle which is larger than 45° in relation to the longitudinal direction of the cross tie (9), and whereby they are transform into an angle which is smaller than 45° in the widening parts (11).

16 Claims, 1 Drawing Sheet

CROSS TIE FOR A VEHICLE CHASSIS AND METHOD FOR MAKING THE SAME

The present invention concerns a method for making a cross tie for a vehicle chassis, according to which method the vehicle chassis is made at least partially of composite material.

By composite material is meant here a plastic such as polyester, reinforced with fibres, in particular glass fibres, carbon fibres, aramid fibres and such.

With their far ends, the cross ties are for example glued to longitudinal runners made of composite material or to trestles which are also made of composite material and with which the cross ties are carried by wheels.

A known method whereby cross ties are made of composite material is described in Belgian patent No. 1.010.366.

Cross ties are made consisting of a round, tubular body which is provided with round flanges on both ends. The body is made by means of pull winding or filament winding, whereas the flanges are made by means of what is called hot press moulding and are glued to the body.

Pull winding is a method whereby one or several layers of reinforcement fibres are wound on an arbor which are soaked with plastic, either before and/or after the plastic is applied in its liquid state, after which the whole is pulled through an extrusion nozzle, and the plastic cures.

Filament winding is a method of whereby reinforcement fibres or ribbons soaked with plastic are wound on a rotating arbor or cylinder, after which the plastic cures.

In the case of hot press moulding, plastic and reinforcement fibres, possibly in the shape of a pre-impregnated fibre mat, are put in a heated mould and are pressed in the required shape under a very large pressure, for example of 100 tons/m$^2$, and they are cured.

It was found that, especially when the vehicle contains a superstructure on the chassis, the above-mentioned known cross ties sometimes cannot resist the torques to which they are subjected when said vehicle takes a bend.

The invention aims to provide a method for making a cross tie with which is obtained a cross tie which remedies the above-mentioned disadvantages and which cannot only resist the bending forces well, but which can also resist the torques particularly well.

This aim is reached according to the invention in that the cross tie is made with an almost cylindrical centre part and a part connected to both ends thereof which widens towards the end of the cross tie, whereby the above-mentioned parts are made in one piece by means of filament winding, and the filaments are provided in the central part at an angle which is larger than 45° in relation to the longitudinal direction of the cross tie, and whereby they are transformed into an angle which is smaller than 45° in the widening parts.

In the centre part, filaments can be provided in two directions which cross one another which are directed clockwise and anticlockwise respectively at an angle which is larger than 45° but smaller than 80° in relation to the longitudinal direction of the cross tie.

Preferably, at least one hard piece, for example a flange, is provided on the broadest end of the widening parts, worked into the composite material.

In this piece can be provided one or several openings in which a thread is tapped.

In these openings can be screwed bolts with which the cross ties are retained in relation to a part such as a longitudinal runner or a trestle of the vehicle chassis as the glue hardens, with which this end is glued to a longitudinal runner or a trestle.

The invention also concerns a vehicle chassis provided which at least one cross tie made according to any of the preceding embodiments, whereby the widening parts of this cross tie are glued with their ends to parts made of composite material of the chassis, for example directly to two longitudinal runners or to two trestles which are connected to these longitudinal runners.

In order to better explain the characteristics of the invention, the following preferred embodiment of a method and a vehicle chassis according to the invention is described as an example only without being limitative in any way, with reference to the accompanying drawings, in which:

FIG. 1 schematically represents a side view of a vehicle provided with a chassis according to the invention;

Figure 1:
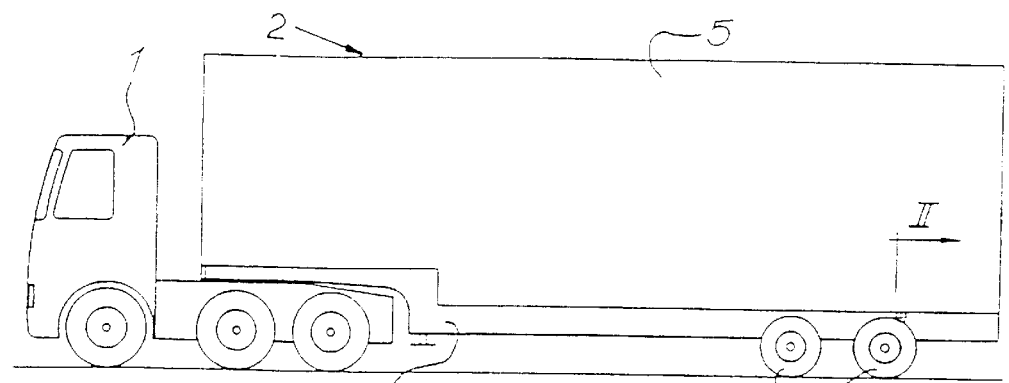

FIG. 1 shows a combination of a lorry 1 and a trailer 2, whereby the trailer 2 in the conventional manner consists of a chassis 3 which rests on two wheel sets 4 in the back, for example via trestles, and which carries a superstructure 5.

Figure 2:
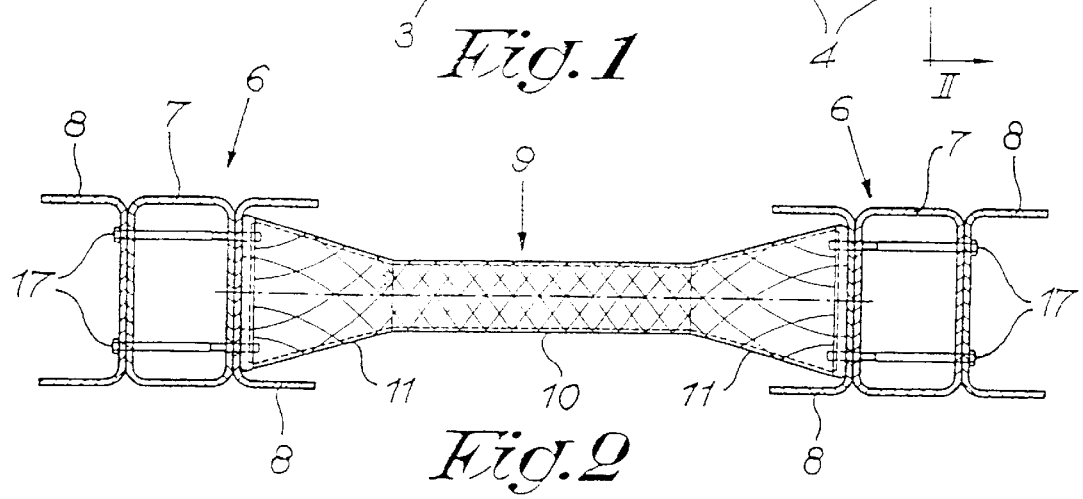
FIG. 2 represents a section according to line II—II in FIG. 1 to a larger scale, whereby only the chassis and a cross tie are represented.

The chassis 3 contains two longitudinal runners 6 made of composite material, for example of polyester reinforced with glass fibres, which as represented in FIG. 2, consist of a central profile 7 with an almost rectangular section and two U-shaped profiles 8 which are glued against the latter with their cores.

These profiles 7 and 8 are made by means of pulltrusion, whereby the fibres soaked with plastic are thus extruded.

These longitudinal runners 6 are connected to one another by means of cross ties 9, of which only one is represented in the figures for the sake of simplicity.

Every cross tie 9 contains a tubular or cylindrical centre part 10 and two hollow parts 11 connected to the far ends thereof and which are trumpet-shaped or, as represented in FIG. 2, which widen conically towards the far ends of the cross tie 9.

The parts 10 and 11 are entirely made in one piece out of plastic reinforced with filaments or fibres by means of filament winding, whereby the filaments are directed differently in the widening parts 11 than in the centre part 10.

In the centre part 10 are provided filaments which cross one another under gradients, clockwise and anticlockwise respectively, forming an angle which is smaller than 45°, in the given example an angle of about 52°, together with the longitudinal direction of the part 10.

On the widening parts 11, this gradient is transformed into an angle which is smaller than 45°, and even into an angle of 10° or less on de broadest ends of these parts 11.

Figure 3:
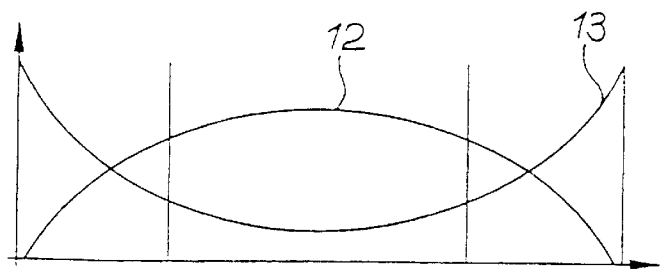
FIG. 3 shows a graph of the maximum moment of torsion, bending moment respectively, over the length of the cross tie from FIG. 2.

In this way, the resistance to torque or the centre part 10 is very large, especially in the middle, where the torques are the largest when the vehicle is in use, and the curve 12 in FIG. 3 represents the maximum torque over the length of the cross tie 9.

The parts 11, however, resist the bending well. The curve 13 in FIG. 3 represents the maximum bending moment over the length of the cross tie 9.

Due to the increase of the addendum line towards the end of the parts 11, said bending resistance of these parts is even increased, and moreover the transformation of the angle of the fibres is simplified.

As becomes clear from this FIG. 3, the bending resistance is maximal and relatively large on the far ends of the cross tie 9, i.e. there where the largest bending moments may occur when the vehicle is in use. The cross tie 9 should be seen as clamped in between the longitudinal runners 6, so that in case of torsion on the chassis 3, shearing forces are created between the longitudinal runners 6 and the far ends of the cross tie 9 which are glued onto them.

Figure 4:
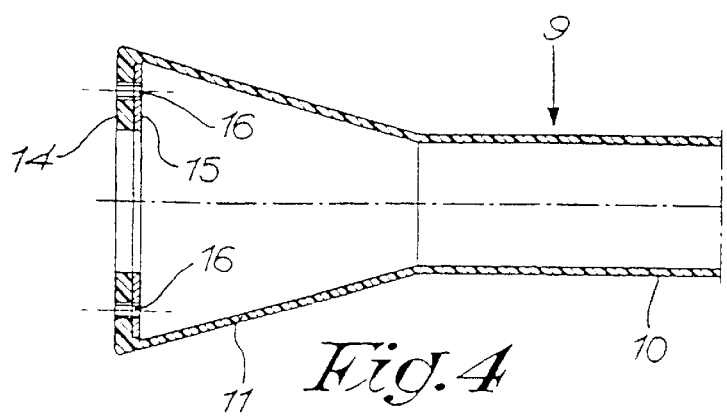
FIG. 4 shows a longitudinal section of the cross tie from FIG. 2, drawn to a larger scale.

The far ends of the cross tie 9 are glued against a core of a profile 8 of a longitudinal runner 6 by means of for example a polyurethane or epoxy glue, and in order to enlarge the contact surface, the cross tie 9 contains an edge 14 on the broadest end of the parts 11 directed to the geometrical axis of the cross tie 9, as represented in detail in FIG. 4.

These edges 14 are thus made by means of filament winding together with the parts 11.

Moreover, a hard piece 15 is worked into the edge 14 of every part 11 made of composite material, in the given example in the shape of a flange, in which, opposite openings in the edge 14, have been provided openings 16 provided with screw thread.

This flange, which is for example situated on the inner side of the edge 14, can be made of metal such as steel or aluminium, or of composite material by means of hot press moulding.

The openings 16 make it possible to keep the far ends of the cross tie 9 temporarily in place by means of bolts 17 after they have been glued in. These bolts 17, as represented in FIG. 2, are nut through a longitudinal runner 6 and are screwed in an opening 16, so that one end of the cross tie 9 is held against the core of a profile 8 of the longitudinal runner 6.

The invention is by no means limited to the above-described embodiments represented in the accompanying drawings; on the contrary, such a method and such a vehicle chassis can be made in all sorts of variants while still remaining within the scope of the invention as set out in the accompanying claims.

What is claimed is:

1. A method for making a cross tie for a vehicle chassis according to which method the cross tie is at least partially made of composite material, said method comprising the steps of forming the cross tie with a substantially cylindrical central part and a widening part connected to both ends thereof which widens towards the end of the cross tie, wherein said central and widening parts are made into one piece by means of filament winding, including winding the filaments in the central part at an angle which is larger than 45° in relation to the longitudinal direction of the cross tie, and an angle which is smaller than 45° in the widening parts.

2. Method according to claim 1, including winding the filaments in the center part in two directions which cross one another and which are directed clockwise and anticlockwise respectively at an angle which is larger than 45° but smaller than 80° in relation to the longitudinal direction of the cross tie (9).

3. Method according to claim 1, including the step of making the widening parts hollow with an edge on their broadest end directed to the geometrical axis of the cross tie which is made by means of filament winding together with the widening parts.

4. Method according to claim 1, including working in on the broadest end of the widening parts (11) at least one hard piece (15) in the composite material.

5. Method according to claim 4, wherein before or after the hard piece has been worked in an end portion of the cross tie, at least one opening is provided in the latter in which threads are tapped.

6. Method according to claim 4 wherein, the hard piece (15) is made of a material selected from the group consisting of: steel and aluminium and composite material made by means of hot press moulding.

7. Method according to claim 4, including working in a hard piece (15) in the shape of a flange.

8. Method according to claim 7, wherein the piece in the shape of a flange is provided on the inner side of the edge (14).

9. A cross tie for a vehicle chassis, the cross tie comprising a substantially cylindrical central part and a widening part connected to both ends thereof which widens towards the end of the cross tie, said central and widening parts being made by means of filament winding, wherein the filaments are provided in the central part at an angle which is larger than 45° in relation to the longitudinal direction of the cross tie, and are transformed into an angle which is smaller than 45° in the widening parts, said widening parts of said cross tie connecting at end portions thereof to a vehicle chassis.

10. The cross tie according to claim 9, wherein the widening parts are hollow, the cross tie having a broad edge on the broadest ends of the widening parts directed towards the geometrical axis of the cross tie.

11. Vehicle chassis according to claim 9, wherein at the far ends of the widening parts (11) of the cross tie (9) at least one metal piece (15) in which is provided at least one opening (16) provided with screw thread in which is screwed a bolt (17) which protrudes through the part of the chassis (3) is worked in.

12. The cross tie according to claim 9, wherein the filaments in the center part are wound in two directions, each direction crossing one another and being directed in clockwise and anticlockwise directions, respectively, at an angle which is larger than 45° but smaller than 80° in relation to the longitudinal direction of the cross tie.

13. The cross tie according to claim 9, further comprising at least one hard piece provided at the end portions of the widening parts, said hard piece being incorporated into the cross tie.

14. The cross tie according to claim 13, wherein the at least one hard piece includes at least one opening provided with a screw thread for receiving a bolt protruding from a vehicle chassis.

15. The cross tie according to claim 13, wherein the at least one hard piece is made of a material selected from the group consisting of: steel, aluminum and composite material made by means of hot press molding.

16. The cross tie according to claim 13, wherein the hard piece defines a flange shaped profile provided along an inner side of the broad edge of the widening part.

* * * * *